Figure 4:
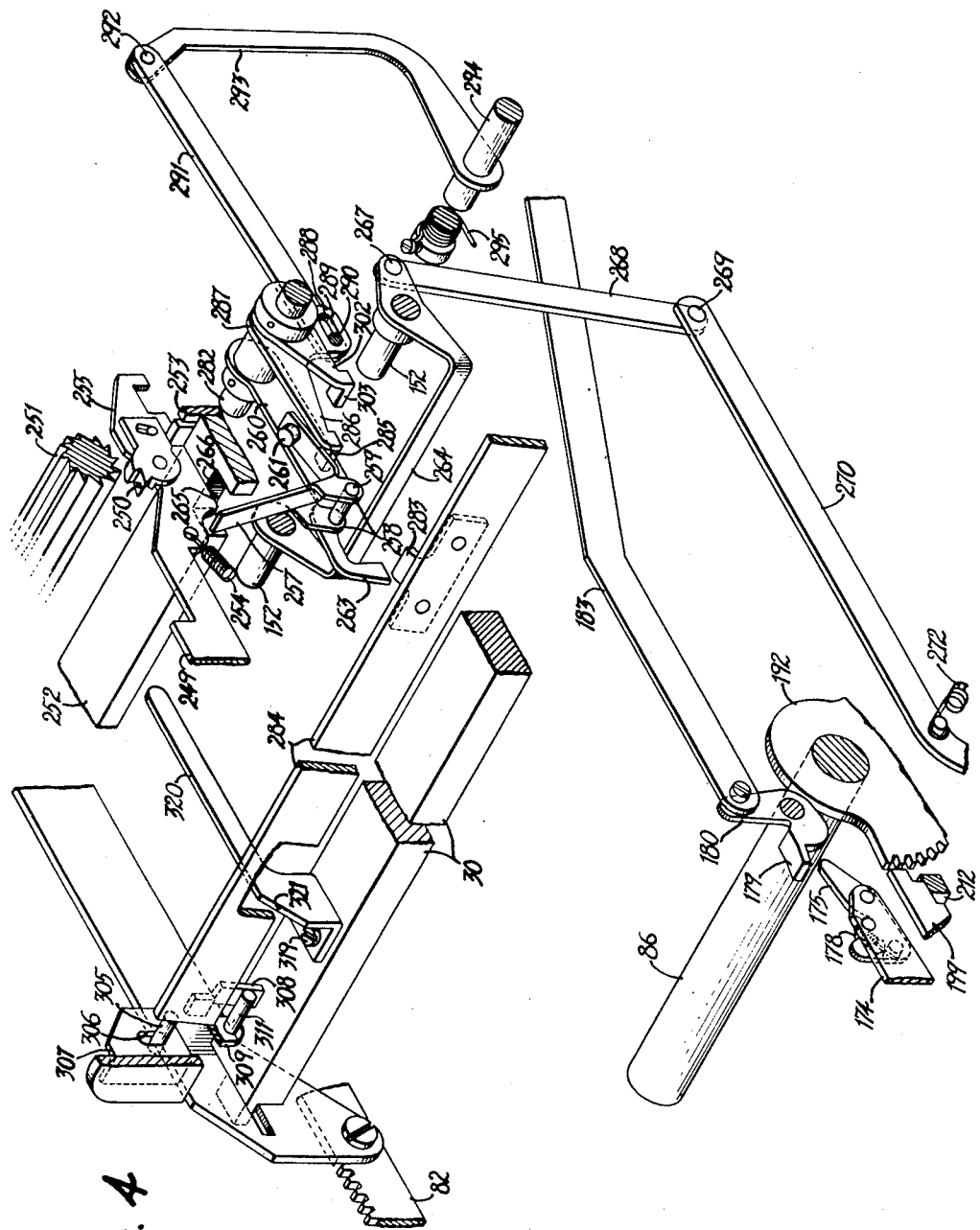

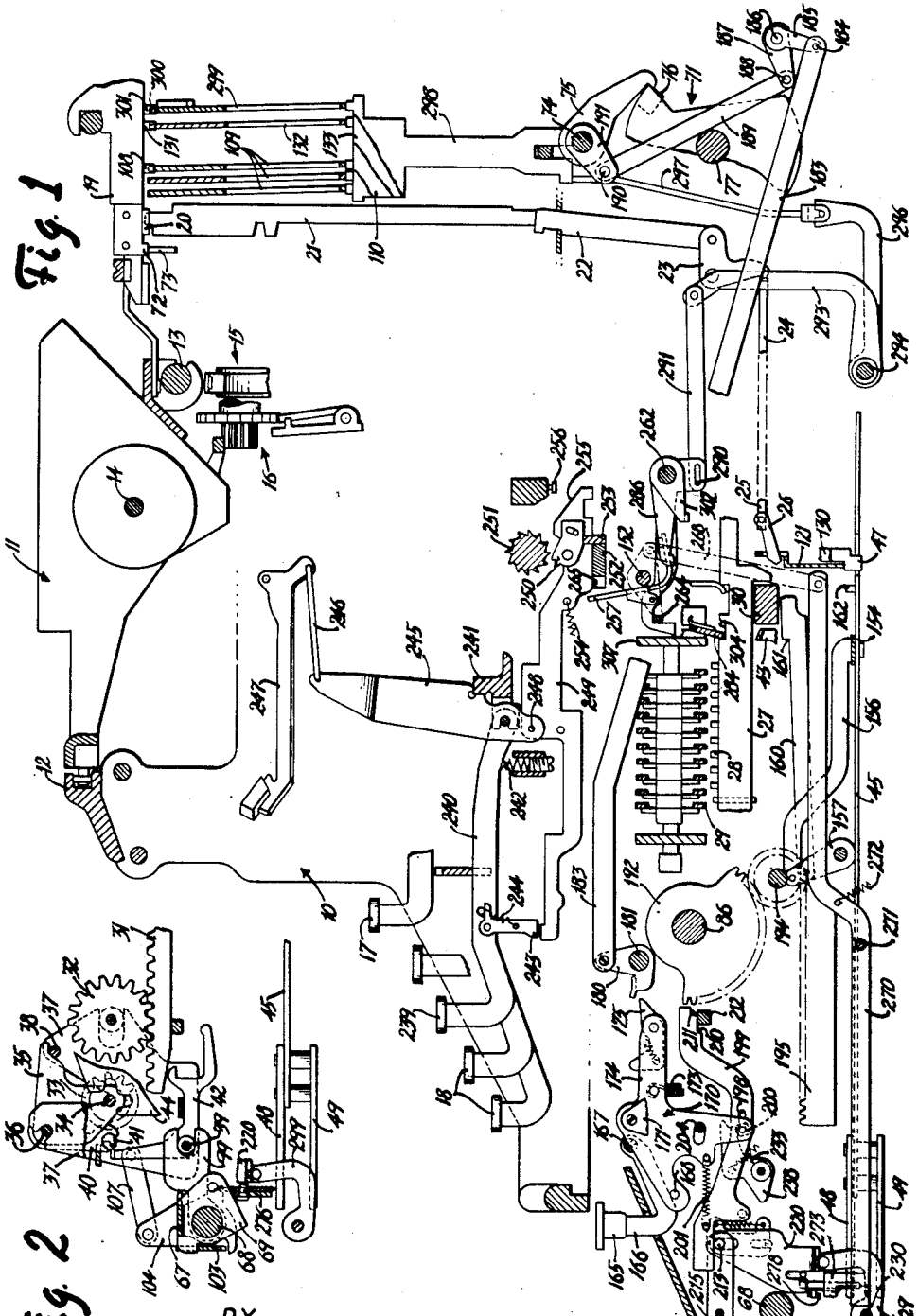

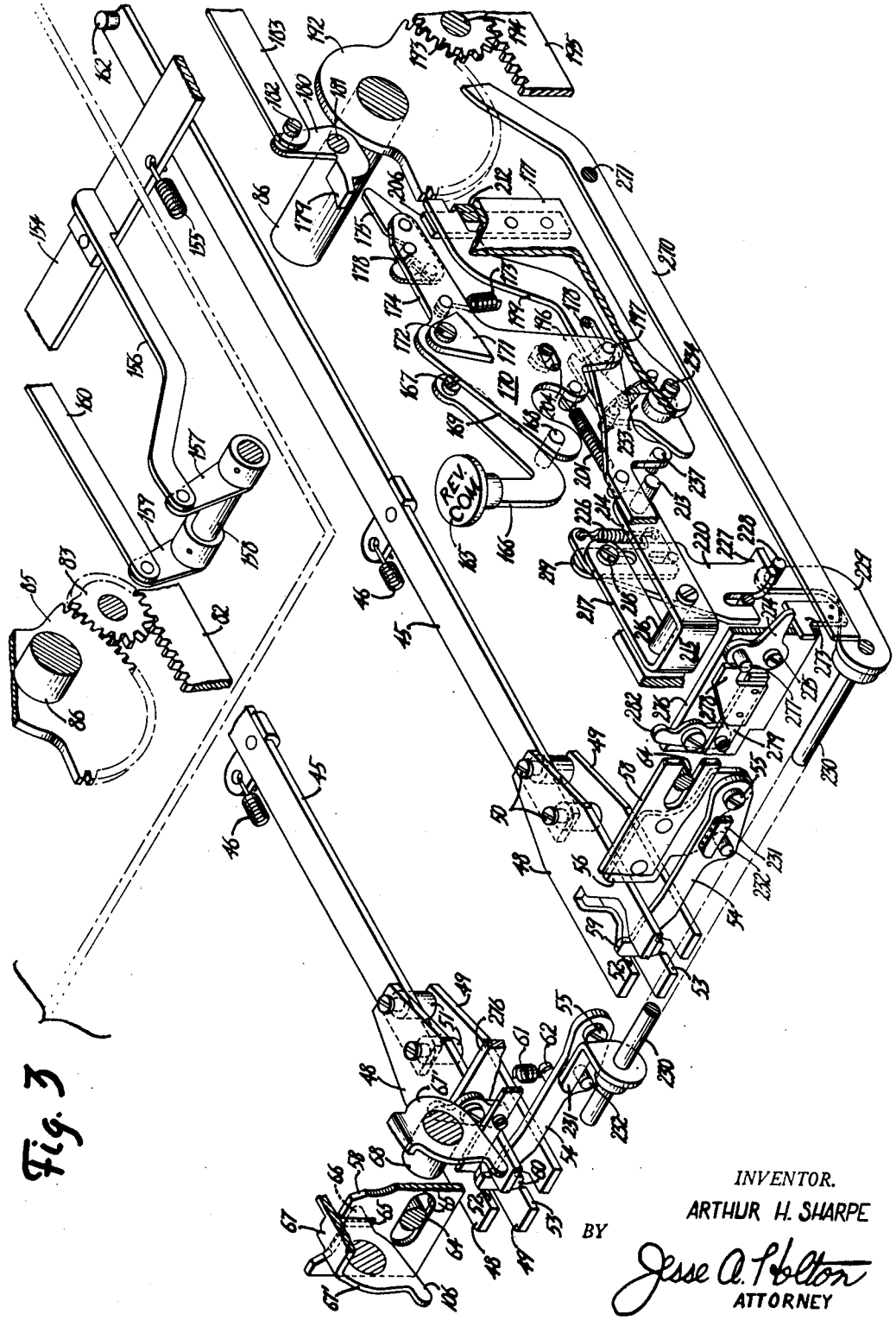

June 30, 1953  A. H. SHARPE  2,643,818
TOTALIZER FUNCTION SELECTION AND SYMBOL PRINTING MECHANISM
Filed Sept. 15, 1948  7 Sheets-Sheet 3

INVENTOR.
ARTHUR H. SHARPE
BY
Jesse A. Holton
ATTORNEY

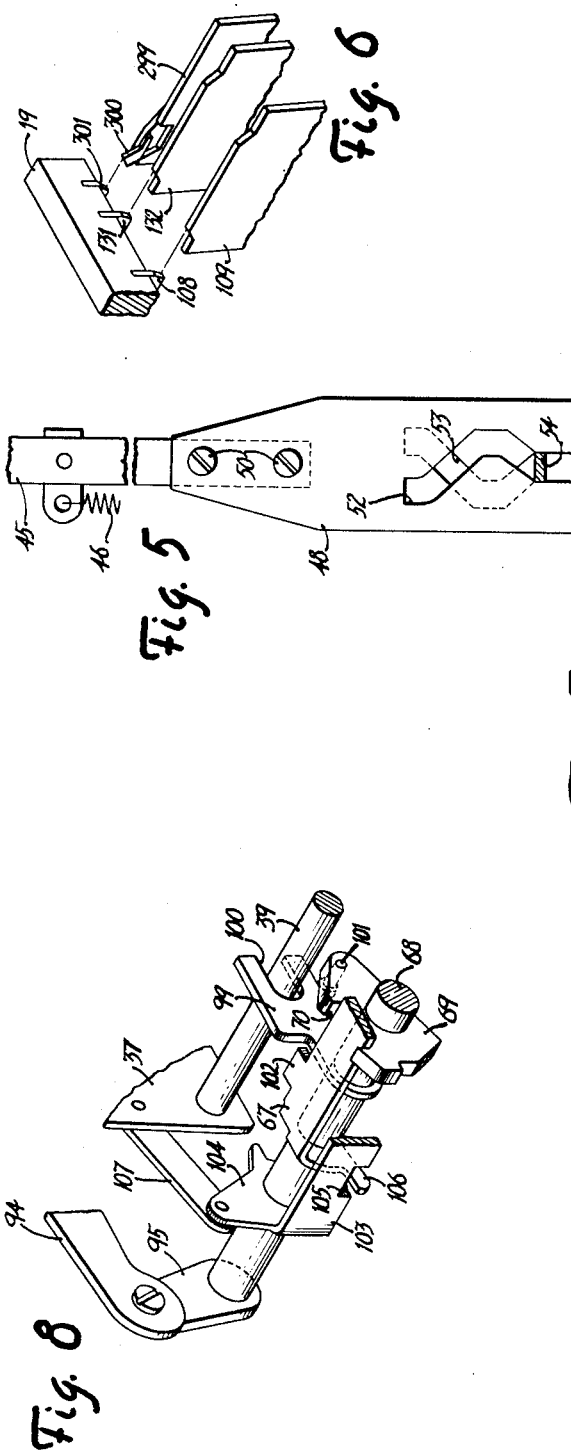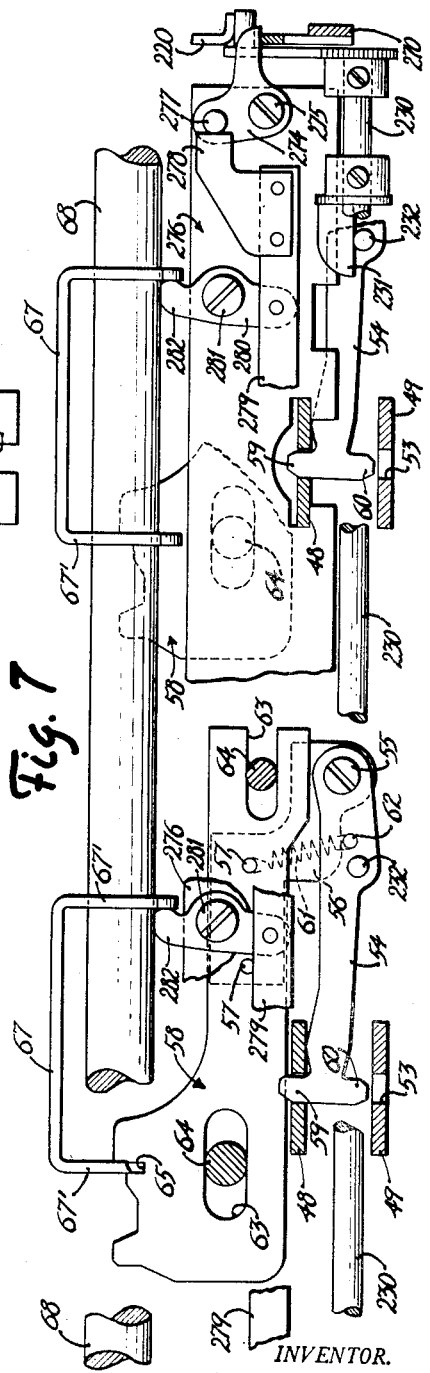

INVENTOR.
ARTHUR H. SHARPE
BY
Jesse A. Holton
ATTORNEY

June 30, 1953 A. H. SHARPE 2,643,818
TOTALIZER FUNCTION SELECTION AND SYMBOL PRINTING MECHANISM
Filed Sept. 15, 1948 7 Sheets-Sheet 6
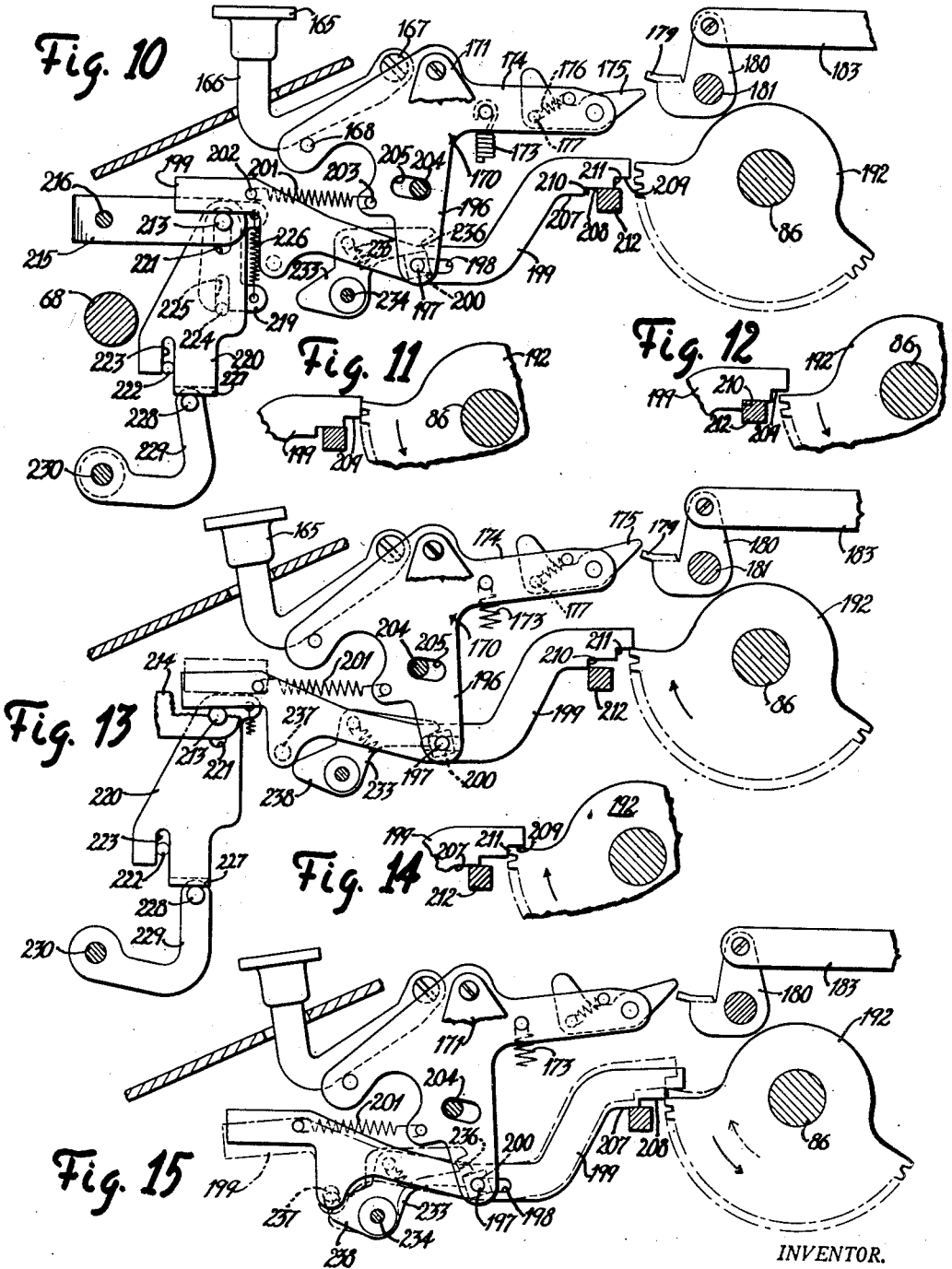
INVENTOR.
ARTHUR H. SHARPE
BY
Jesse A. Holton
ATTORNEY

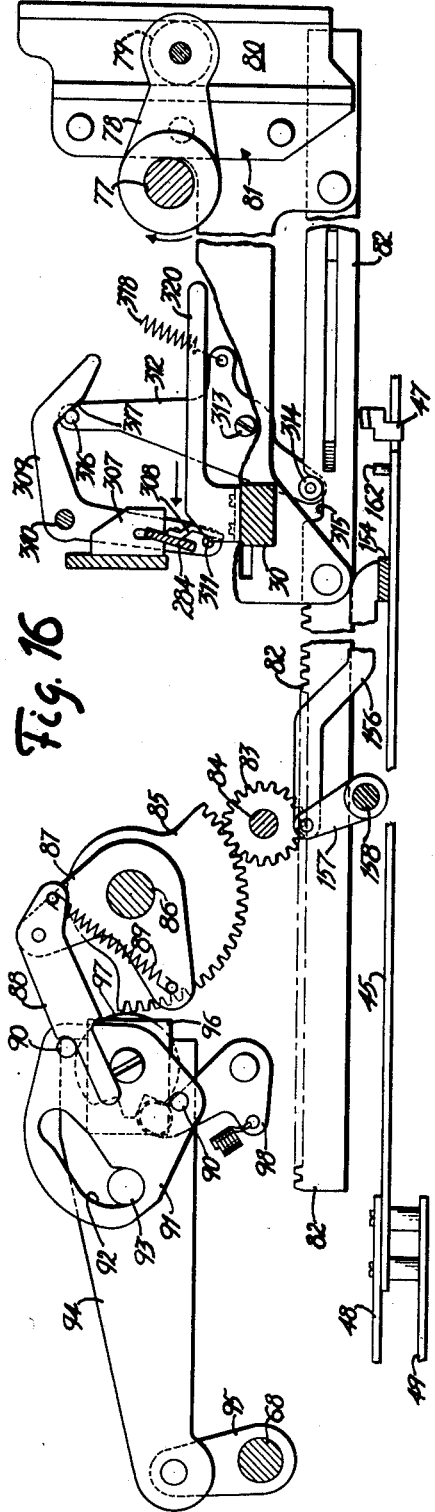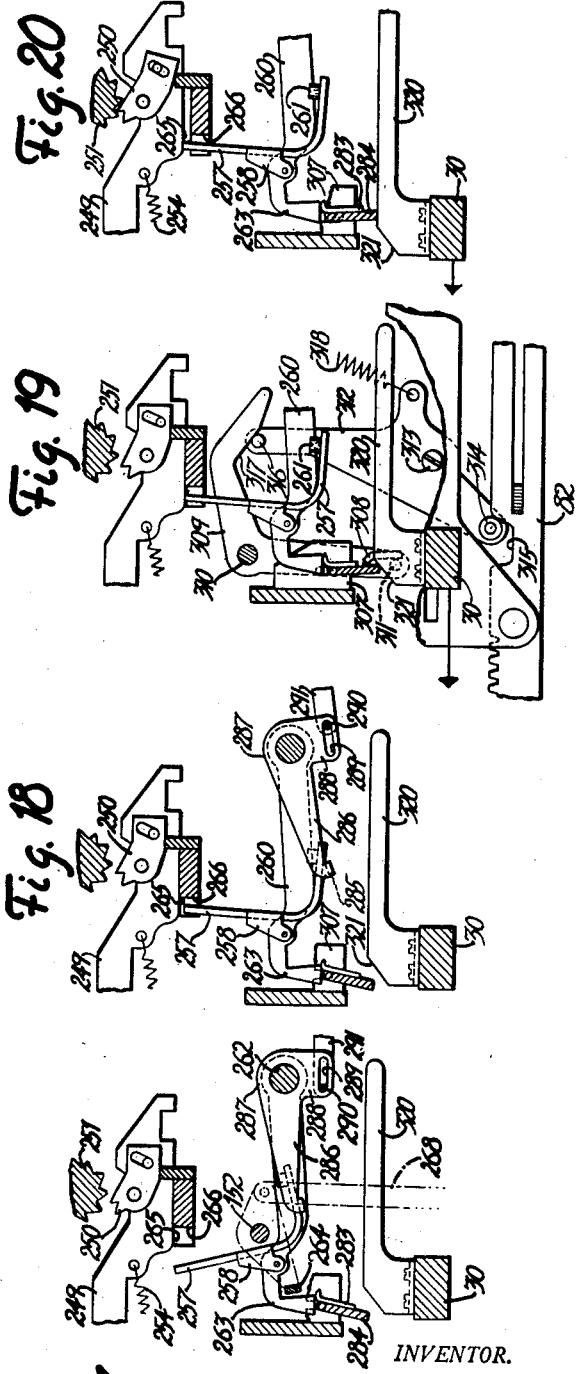

Patented June 30, 1953

2,643,818

UNITED STATES PATENT OFFICE 2,643,818

TOTALIZER FUNCTION SELECTION AND SYMBOL PRINTING MECHANISM

Arthur H. Sharpe, Hartford, Conn., assignor to Underwood Corporation, New York, N. Y., a corporation of Delaware Application September 15, 1948, Serial No. 49,345

6 Claims. (Cl. 235—60.18)

This invention relates in general to combined typewriting and computing machines, also known as bookkeeping machines. Such machines are adapted to compute in several different columns on a work sheet and are commonly provided with a plurality of totalizers for accumulating amounts. The totalizers to be employed in the various columns are selected by the traveling carriage of the typewriter for performing the functions of addition or subtraction in accordance with a predetermined schedule.

It is an object of this invention to provide a computing machine, having a plurality of totalizers and means operable by a traveling carriage to select one or more of said totalizers for performing addition or subtraction, with manually selectable means whereby any totalizers which are carriage-selected for "add" may be made to "subtract," and vice versa.

It is a further object of the present invention to provide a credit balance bookkeeping machine, as above set forth, with means whereby a "minus" sign or other negative-quantity indicating symbol will be automatically printed afteradjacent an amount which has been subtractively entered into a totalizer.

It is a still further object of the present invention to provide certain new elements the use of which in a computing machine will add to the flexibility of such machine.

These and other objects, features and advantages will become more readily apparent as the description of one preferred embodiment of the invention proceeds.

Referring now to the drawings for the details of construction:

Fig. 1 is a side elevational view, partly in section, of a bookkeeping machine embodying the present invention, many of the old parts being omitted for clarity of illustration, Fig. 2 is a small detail view of one of the totalizers, partially showing the tens-carry-over mechanism and also partially showing the means for selecting the totalizer for addition or subtraction, Fig. 3 is a perspective view showing a portion of the mechanism for causing a totalizer which has been carriage-selected for addition to perform the function of subtraction and vice versa, and also showing a portion of the negative-quantity symbol operating train, Fig. 4 is a continuation of Fig. 3 and showing further details of the negative-quantity symbol operating train, Fig. 5 is a plan view of the forward portion of a state-control slide in accordance with the present invention, Fig. 6 is a fragmentary perspective view of the various automatic control devices, Fig. 7 is a front elevation of a portion of the means for shifting a bail-operating follower from the state-control slide cam slot in which it is normally positioned to a second state-control slide cam slot and also showing a portion of the negative-quantity symbol conditioning train.

Figure 9:
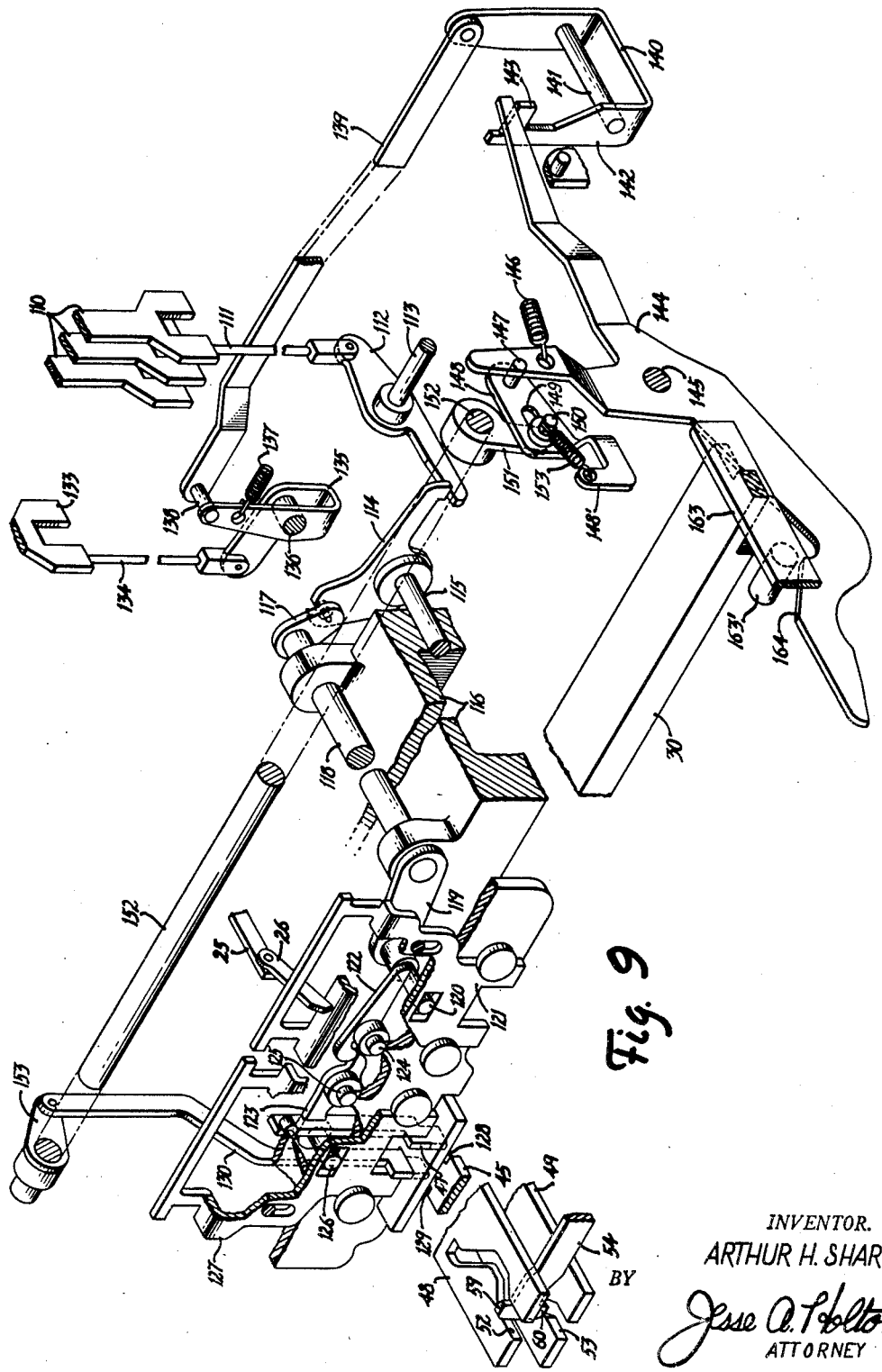

Fig. 8 is a perspective view of part of the mechanism for shifting a totalizer into an adding or subtracting position, Fig. 9 is a perspective view of the carriage-operated controls for a state-control slide, Figs. 10–15 are detail views showing various stages in the operation of the means for shifting the bail-operating follower from one state-control slide cam slot to the other, and Figs. 16–20 are detail view showing various stages in the operation of the means for printing a negative-quantity indicating symbol.

In Fig. 1, the frame of the typewriting unit of the machine is generally indicated at 10, and the usual letter-spaceable carriage is generally designated 11. The carriage 11 rides upon and is guided by the usual front and rear rails designated 12 and 13, respectively, and carries the line-spacing roller platen 14. A spring motor, partially shown at 15, tends to move the carriage in letter-feed direction, and an escapement mechanism, partially shown and generally indicated at 16, normally constrains the carriage to move in letter-feed direction with a step-by-step motion.

The typewriter is provided with a set of denominational tabulator keys 17, which may operate any desired type of tabulating mechanism and has the usual typewriter keyboard some of the keys of which are indicated in Fig. 1 at 18.

The type of machine to which the present invention is particularly adaptable is more fully illustrated in Patent No. 2,372,681, issued April 3, 1945, to H. L. Pitman. Such machines are adapted for printing and computing in several different columns on a work sheet and are provided with a plurality of totalizers any one or more of which may be employed in each column. For selecting the particular totalizer or totalizers for use in each column, the carriage is provided with a plurality of column units, only one of which is shown and indicated at 19 in Figs. 1 and 6. Each column unit is provided with one or more totalizer-selecting dogs, as will later be more fully explained.

In addition to the totalizer-selecting dogs, the column unit 19 is provided with a denominational tappet 20 for cooperating with a group of denominational jacks 21. The jacks 21 rest upon intermediate push rods 22, which in turn are pivotally connected to bell cranks 23. One arm of each bell crank 23 abuts a master rod 24, and each master rod 24 is operatively connected to a plurality of differential actuator operating rods 25. At each denominational position in a computing column, the tappet 20 depresses one of the denominational jacks 21, and the operating rod 25, corresponding to that denomination in each of the totalizers, is moved forward. This arrangement is fully explained in the above referred to Patent No. 2,372,681.

Each operating rod 25 has a coupler element 26 pivotally connected to its forward end, and when a totalizer is selected for operation, the couplers 26 are raised from the inactive position, shown in Fig. 1, to a position of operative alignment with a set of differential actuators 27. Though only one operating rod 25 and one differential actuator 27 are shown in the present drawings, it will readily be understood that there is one rod 25 and one actuator 27 for each denominational order of each totalizer or each totalizer group if interspersed totalizers are employed.

As the carriage steps from one denominational position to another due to depression of the numeral keys of the typewriter, the denominational tappet 20 depresses the various denominational jacks 21, which will, in turn, cause the differential actuators of the totalizers which have been selected for operation to be given, seriatim, a slight advancing movement. This movement of the differential actuators is just sufficient to align a set of indexable pins 28, with which each actuator is provided, with a common set of pin setting bars 29. The pin setting bars 29 are operated by the numeral type actions so that as a numeral key is struck, the numeral is typed upon the work sheet and the corresponding pin 28 is set in the differential actuator for that denomination of any totalizers which have been selected. Since the manner of indexing the differential actuators forms no part of the present invention, the same has not been completely illustrated, but reference may be had to Patent No. 2,258,714, issued October 14, 1941, to H. L. Pitman for the details thereof.

As the type bar returns from typing and indexing the units order numeral, the carriage escapes to the next letter-space position, and during such movement, a cycle of the general operator is automatically instituted. During a cycle, a general operator bar 30 moves from the position shown in Fig. 1 to a forward position and return, and during its forward movement, the differential actuators are picked up and moved forward in accordance with the setting of pins 28. The differential actuators are provided upon their forward ends with rack teeth 31, which are continuously in engagement with the teeth of idler gears 32; see Fig. 2.

The totalizers employed in the machine of the present invention are of the multiple interspersed type which are constructed and operated as fully explained in copending application No. 2,654, filed January 16, 1948, by H. L. Pitman. In general, it is to be observed that each totalizer comprises a plurality of axially aligned wheels and that there are two or more juxtaposed wheels for each denominational order. One wheel for each order is normally aligned with the differential actuator 27 for that order, but by means of the mechanism described in the above-mentioned application, the totalizer group may be laterally shifted to bring another set of wheels into alignment with the differential actuators. Of course, if desired, the interspersed feature may be dispensed with and single totalizers may be employed.

Inasmuch as the details of construction of the totalizers do not form a vital part of the present invention, only so much has been shown in Fig. 2 as is necessary for a general understanding thereof. The various wheels of the totalizer are represented at 33 by dot-and-dash lines. The wheels 33 are individually rotatable upon a shaft 34, and the shaft 34 is mounted in a pair of side plates 35, only one of which is shown, but which corresponds to the side plates 52 in the above-mentioned copending application of H. L. Pitman. Also interconnecting the side plates 35 are a plurality of cross rods one of which is indicated at 36. The cross rods 36 and side plates 35 comprise an inner frame which is laterally shiftable to align one or another set of the interspersed wheels with the set of differential actuators. The inner frame is mounted within an outer frame comprising a pair of end plates 37, which correspond to plates 66 of the above referred to Pitman application, secured together by a pair of cross rods 38 and 39.

There is a detent pawl 40 and a carry-over trip lever 41 for each of the wheels 33. The pawls 40 and levers 41 are spring-urged toward the wheels and are swingably mounted upon the cross rod 36. Mounted upon the cross rod 39 are a plurality of carry-over levers one of which is indicated at 42. As explained in the above referred to Pitman application, there is one lever 42 for each denominational order of the totalizer. The carry-over levers 42 cooperate with a group of carry-over bars, not shown, which, in turn, cooperate with a second set of carry-over levers pivotally mounted upon the general operator bar 30. One of the second set of carry-over levers is partially shown in Fig. 1 at 43.

The outer frame of the totalizer, comprising the end plates 37 and cross rods 38 and 39, is mounted between a pair of mounting plates, one of which is partially shown in Fig. 2 at 44, and is movable, as will presently be more fully described, to mesh the wheels of the totalizer with the differential actuator rack teeth 31 or with the teeth of idler gears 32.

A state-control slide 45 is provided for each interspersed group of totalizers. Each state-control slide is urged in a forward direction by a spring 46 but is normally held in a retracted position by a latch 47, as best shown in Figs. 1, 3 and 9. The state-control slides are releasable for movement to two different forward positions, as will presently be fully explained. On its forward end, each state-control slide carries a pair of cam plates 48 and 49 secured thereto by bolts 50 and spaced apart by spacer sleeves 51. The cam plate 48 has a tortuous cam slot 52 therein, and the cam plate 49 is provided with a tortuous cam slot 53. As may best be seen in Fig. 5, the cam slots 52 and 53 are of opposite tortuosity.

A cam follower 54, best seen in Figs. 3 and 7, is pivotally connected at 55 to a plate 56, which plate, in turn, is riveted at 57 to a slidable plate 58. The cam follower 54 is provided with a pair of cam slot engaging heads 59 and 60. A spring 61, extending between one of the rivets 57 and a pin 62 on the follower 54, normally holds the follower up in a position such that the follower head 59 is positioned within the cam slot 52. A cam follower 54 is provided for each state-control slide. The plate 58 is provided with a pair of elongated slots 63 to guidably mount said plate upon a pair of stationary pins 64. The plate 58 is provided with a notch 65 into which is loosely fitted a tab 66 on a bail member 67. The bail member 67 is slidably mounted upon a rock shaft 68 by means of a pair of end arms 67'. Fixed to the rock shaft 68 is a key member 69, as shown in Fig. 8, provided with a cut-out 70 through which the bail 67 extends. The key member 69 serves to key the bail to the shaft so that as the shaft rocks, the bail will likewise be rocked. The shaft 68 is rocked as will presently be explained during each cycle of the general operator.

The present machine is provided with the usual cycle clutch, diagrammatically shown in Fig. 1 at 71. As the carriage escapes after the typing of the lowest order digit, a cycle trip dog 72 on the column unit 19 depresses a lever partially shown at 73 to cause a shaft 74 to be rocked counterclockwise of the Fig. 1 position. Counterclockwise movement of shaft 74 causes a pawl 75, which is fixed to said shaft, to be moved from engagement with a stud 76 and to thereby allow the clutch 71 to become engaged, as is well understood. When the pawl 75 is momentarily moved from the stud 76, the clutch causes a continuously operating motor, not shown, to drive a shaft 77 through one revolution.

Referring now to Fig. 16, it will be seen that the shaft 77 is provided with a crank arm 78 carrying a roller 79 on its free end. The roller 79 is engaged in a groove 80 of a plate 81 which is attached to a rack bar 82. The teeth of rack bar 82 are engaged with the teeth of a pinion 83. The pinion 83 is rotatably mounted upon a stud 84 and meshes with the teeth of a gear segment 85, which segment is fixed to a cross shaft 86. Also fixed to the cross shaft 86 is a generally V-shaped member 87 which has pivotally mounted upon one arm thereof a pawl 88. The pawl 88 is urged in a clockwise direction, as viewed in Fig. 16, by a spring 89 and cooperates alternately with one or the other of a pair of pins 90 carried by a rockable cam plate 91.

The cam plate 91 is provided with a cam slot 92 within which is fitted a pin 93 fixed to an arm 94. The arm 94 is pivotally connected at one end to an arm 95 fixed to the rock shaft 68 and at its other end is guided upon a square stud 96. A detent comprising a member 97 constrained to rotate with cam plate 91 and a spring-urged pawl 98 serves to resiliently hold the cam plate 91 in its two operated positions. Thus it will be understood that as the shaft 77 rotates clockwise during a cycle, the mechanism above described will cause the rock shaft 68 to be rocked clockwise, as viewed in Fig. 16, during the first half of the revolution of shaft 77, and that during the second half revolution of shaft 77, as the rack bar 82 moves toward the rear, the rock shaft 68 will be rocked counterclockwise to return to the position shown in Fig. 16. The above described mechanism for rocking the shaft 68 is more fully explained in application No. 45,372, filed August 20, 1948, by H. L. Pitman.

Referring now particularly to Fig. 8 and generally to Fig. 2, it will be observed that a device in the form of a member 99, having a notch 100 in one end thereof, is loosely mounted at its opposite end upon the rock shaft 68. A pin 101 mounted in the key member 69 underlies the end of member 99 having the notch and serves to normally hold the member 99 in the Fig. 8 position. The aforementioned rod 39 of the outer frame of the totalizer extends through the notch 100. The bail member 67 is provided with a tab 102 normally positioned out of vertical alignment with the member 99 but movable, as will presently be explained, into vertical alignment with said member.

In addition to the member 99, a second device is associated with each of the totalizers. This second device comprises a bail 103 loosely mounted upon the rock shaft 68 by means of a pair of arms 104, only one of which is shown in Fig. 8. The bail 103 is provided with a notch 105 normally vertically aligned with which is a tail 106 on one of the arms 67' of the bail member 67. The bail member 67 is movable to position the tail 106 out of vertical alignment with the notch 105, as will presently be explained. A pair of links 107, only one of which is shown, extend between the arms 104 and plates 37.

Thus it will be seen that if the bail member 67 is moved so as to position the tab 102 over the member 99, then when the rock shaft 68 is rocked during the early part of a cycle, as previously explained, the tab 102 will be effective to rock the arm 99 downward and consequently rock the outer totalizer frame downward to mesh the wheels 33 of the totalizer directly with the differential actuators 27. Since the tail 106 will at that time be aligned with the notch 105, the bail member 103 will not be affected. When the totalizer wheels are meshed directly with the differential actuators, the wheels will be rotated in an additive direction as the actuators are moved forward.

When the bail member 67 is moved to the left along the rock shaft 68, the tail 106 is positioned out of vertical alignment with the notch 105 and lies directly beneath the lower edge of bail 103, the tab 102 at that time being out of vertical alignment with the member 99. Thus with bail member 67 so positioned, when the shaft 68 rocks during the early part of a cycle, the bail 103 will be rocked by the tail 106 and through the links 107 will move the totalizer toward the rear of the machine to mesh the totalizer wheels 33 with the idler gears 32. When the totalizer wheels are meshed with the idler gears, the wheels will be rotated in a subtractive direction as the differential actuators 27 move forward.

The bail member 67 is moved, to the right for determining addition or to the left for determining subtraction, by means of its state-control slide 45. As previously explained, the head 59 of cam follower 54 is normally positioned within the cam slot of the upper cam plate 48 of the state-control slide. In Figs. 3, 5 and 9, the state-control slides are shown in normal position, and it will be observed from these figures that if the state-control slide is allowed to move forward by a small amount, the follower head 59 will be moved to the right to consequently move the bail member 67 to the right, as aforesaid, and thereby condition the associated totalizer for addition. Likewise, if the state-control slide is allowed to move still farther forward, the follower head 59 and consequently the bail member 67 will be moved to the left to condition the totalizer for subtraction. From Fig. 5 it will be noted that if the follower head 60 is positioned within the lower cam slot 53, then a slight forward movement of the state-control slide 45 will result in moving the bail member 67 to the left to condition the totalizer for subtraction, while an additional forward movement of the state-control slide will result in the totalizer being selected for addition.

As previously mentioned, the state-control slides 45 are normally held in their rearward positions by means of a latch 47. There is a separate latch for each of the state-control slides 45.

Referring to Figs. 1 and 9, the means for releasing the various state-control slides for forward movement will now be explained. Each of the column units 19, which control the operation of the machine in the various computing columns, is provided with one or more totalizer-selecting dogs 108. Only one dog 108 is shown in Fig. 1, but it is to be understood that there is a dog 108 for each totalizer which is to be employed in any given column. The dog 108, as the carriage moves into a computing column, depresses a corresponding cam plate 109. The cam plates 109 rest upon intermediate plates 110, which, in turn, rest upon push rods 111. In Fig. 9, only one of the push rods 111 for totalizer selection is shown, but it will, of course, be understood that there is a rod 111 for each of the intermediate plates 110. The construction and arrangement of the various cam plates, intermediate plates and push rods is more fully described in the hereinbefore mentioned application No. 45,372 of H. L. Pitman.

In Fig. 9, the train of links and levers by which one of the state-control slides is released for forward movement is shown. The other state-control slides are released by similar mechanisms. The push rod 111 is pivotally connected to one end of a lever 112. The lever 112 is pivotally mounted upon a shaft 113, and its opposite end underlies one end of a lever 114. The lever 114 is pivotally mounted upon a shaft 115 fixed to a part of the machine framework 116 and at one end has a pin-and-slot connection with an arm 117. The arm 117 is fastened upon one end of a shaft 118 to the opposite end of which is fastened an arm 119. Arm 119 is provided with a pin 120, which engages in a slot in a coupler section shifter 121. Pin 120 underlies one end of a lever 122 the opposite end of which overlies one end of a lever 123. The levers 122 and 123 are mounted upon stationary pivots 124 and 125, respectively. One end of lever 123 is provided with a pin 126, which engages in a slot in a coupler section shifter 127, and an intermediate portion of the pin-carrying arm of lever 123 is fitted within a notch provided in the latch member 47. Thus when the push rod 111 is depressed, the latch 47 will be withdrawn from engagement within a short notch 128 provided in one side of the state-control slide, and the spring 46 will then move said slide forward until the rear edge of a second and longer notch 129 in the opposite side of said state-control slide strikes a second latch member 130. At this time, the state-control slide will be far enough forward to have moved the follower 54 and consequently the bail member 67 to the right to condition the totalizer for addition. Likewise, as the latch 47 is withdrawn, the coupler section shifters 121 and 127 will be raised to actively position the couplers 26 in alignment with the differential actuators 27, as aforesaid.

In credit or other subtractive columns, the column units for such columns are provided with a subtraction dog 131. The subtraction dog co-operates with a subtraction cam plate 132, which rests upon an intermediate plate 133. The plate 133 rests upon a push rod 134 the lower end of which is pivotally connected to one arm of a bail 135. The bail 135 is pivotally mounted upon a shaft 136 and is urged in a clockwise direction, as viewed in Fig. 9, by a spring 137. One arm of bail 135 is pivotally connected by means of a pin 138 to one end of a link 139 the opposite end of which is pivotally connected to one arm of a bail 140. Bail 140 is pivotally mounted upon a shaft 141 and is provided with an arm 142 having a tongue 143 which underlies one arm of a member 144 pivotally mounted at 145. The member 144 is urged in a clockwise direction, as viewed in Fig. 9, by a spring 146, and one arm of said member is pivotally connected by means of a pin 147 to a link 148. The link 148 is provided with a slot 149 into which is fitted a pin 150 mounted upon an arm 151 fixed to a cross shaft 152. A spring 153 connects the pin 150 to an offset portion 148' of the link 148. Thus when the push rod 134 is depressed by the dog 131 contacting the subtraction cam plate 132, the tongue 143 will be withdrawn from beneath the arm of member 144, and said member will be rocked clockwise by its spring 146. By means of the link 148 and arm 151, the cross shaft 152 will be rocked counterclockwise, as will readily be understood.

Each of the latch members 130 is pivotally connected to an arm 153 fixed to the cross shaft 152. Thus when the shaft 152 is rocked counterclockwise, as viewed in Fig. 9, all of the "subtract" latches 130 will be withdrawn and any state-control slides from which the "add" latches 47 have been withdrawn will be moved forward to a position whereat the follower 54 and consequently the bail member 67 will be moved to the left to determine a subtractive operation of the totalizer.

The above-described mechanisms for effecting withdrawal of the latches 47 and 130 are more fully explained in the hereinbefore referred to copending application Serial No. 45,372, filed August 20, 1948, by H. L. Pitman.

After the indexed numbers have been run into the wheels of the totalizers, it is necessary to restore the state-control slides to their normal retracted positions in order that another group of totalizers may be carriage-selected in the next computing column. The latches 47 and 130 must, of course, also be restored to hold the state-control slides in their retracted positions.

The mechanism by means of which the state-control slides are restored is fully described in the application Serial No. 2,654, filed January 16, 1948, by H. L. Pitman, previously referred to. Briefly described, the restoring mechanism comprises a universal bar 154, which is urged toward the front of the machine by a spring 155; see particularly Fig. 3. A link 156 is connected at one end to the bar 154, and at its opposite end is pivotally connected an arm 157 fixed to a cross shaft 158. A second arm 159 is also fixed to the cross shaft 158, and to this second arm is pivotally connected a draw link 160. The draw link 160 is provided with a shoulder 161, as shown in Fig. 1, for cooperating with the lower bottom edge of the general operator bar 30.

Referring to Fig. 1, the draw link 160 is held up by a means not shown in such manner that as the general operator bar 30 returns to the Fig. 1 position, after having moved toward the front of the machine to run the amount indexed in the differential operator bars 27 into the totalizer, the lower rear edge of said general operator bar strikes the shoulder 161 and thereby pulls the draw link 160 toward the rear. Rearward movement of draw link 160 will, of course, result in a rearward movement being imparted to the universal restorer bar 154. Each of the state-control slides is provided with a pin 162, and as the restorer bar 154 moves rearward, it picks up, by means of the pin 162, any of the state-control slides which have previously moved forward and restores same to a retracted position. At the final moment of the cycle, a device, not shown fully explained in the above referred to application Serial No. 2,654, kicks the draw link 160 downward to disengage the shoulder 161 from the rear edge of the general operator bar. The spring 155 is then effective to return the restorer bar 154 to the position shown in Fig. 1.

During the early part of the cycle, a pin 163' (Fig. 9) carried by a link 163 strikes an inclined surface 164 of an arm of the member 144 and rocks said member in a counter-clockwise direction. The link 163 is attached to one end of the general operator bar 30 and serves to move that end of said bar. At the time the member 144 is rocked counterclockwise, the "subtract" latch 130 cannot move down because the notch 129 into which said latch fits has moved forward, and the end of the latch will strike against the top side of the state-control slide. The counterclockwise movement of member 144 will, therefore, be effective to tension the spring 153, and as the state-control slide becomes restored, the spring 153 will snap the latch member 130 down into its notch 129. A spring not shown, but attached to the lever 123, serves to snap the "add" latch 47 into its notch 128 as the state-control slide becomes restored.

Thus it will be seen that by various arrangements of the dogs 108 and 131 of the column units 19, the machine may automatically select certain totalizers for addition in some work sheet columns and the same or other totalizers for subtraction in other work sheet columns in accordance with any prearranged schedule.

It sometimes happens that the operator desires to subtract in a column wherein the totalizers are carriage-selected for addition and vice versa. This invention provides a single key which when depressed will cause all totalizers which would normally "add" in a given column to "subtract" and vice versa. This key is particularly useful after a mistake has been made by the operator in entering an amount in a column. If an amount is erroneously entered, the carriage may be returned to that same column and re-entered after the above-mentioned key is depressed, and the totalizer will thereby be returned to the amount standing therein before the erroneous amount was entered.

The single key for causing subtraction to be performed in the totalizers which are carriage-selected for addition and vice versa, which may conveniently be referred to as a Reverse Computing key, is designated 165 in the drawings. The key 165 is carried by a key stem 166, which is pivotally mounted upon the machine framework at 167. The key stem 166 rests upon a pin 168 carried by an arm 169 of a member 170. The member 170 is pivotally mounted upon a stationary plate 171 at 172 and is urged in a clockwise direction, as viewed in the drawings, by a spring 173. Another arm, 174, of the member 170 has pivotally mounted upon the end thereof a pawl 175. A spring 176 (Fig. 10), extending between a pin 177 on said pawl and a pin 178 on the arm 174, urges the pawl in a clockwise direction, and the pin 178 limits the clockwise movement of said pawl.

When the Reverse Computing key 165 is depressed, the member 170 will be rocked counterclockwise against the action of its spring 173, and the end of pawl 175 will contact a tab 179 of a bell crank 180. The bell crank 180 is mounted upon a stationary pivot 181, and one arm of said bell crank is pivotally connected at 182 to one end of a link 183. As the pawl 175 contacts the tab 179, the bell crank 180 will be rocked clockwise to thereby impart a rearward movement to the link 183.

Referring now to Fig. 1, it will be seen that the end of link 183 opposite the end which is connected to the bell crank 180 is pivotally connected at 184 to an arm 185. The arm 185 is fast upon a shaft 186, and a second arm 187 is also fixed to the shaft 186. The arm 187 is pivotally connected at 188 to one end of a link 189 the opposite end of which is pivotally connected at 190 to an arm 191 fixed to the hereinbefore mentioned shaft 74. Thus depression of the key 165 results in rearward movement of the link 183, and rearward movement of link 183 will, through the train above described, cause the shaft 74 to be rocked counterclockwise. As previously explained, counterclockwise rocking of shaft 74 will cause the machine to cycle.

The cycle instituted by the key 165 will be a blank cycle. That is to say, no amount will be run into the totalizer wheels because the differential actuators 27 will not have been indexed at that time. However, if the carriage is in a computing column at the time the blank cycle takes place, the state-control slides 45 of the totalizers selected by the carriage in such column will have moved forward, and they will be returned during the blank cycle. The returned state-control slides will not remain in their home positions, however, because the dogs of the column unit 19 will still be resting upon the totalizer-controlling cam plates, and the latches 47 and 130 will, therefore, not return to a position for holding the state-control slides. This momentary return of the state-control slides is utilized in the present invention in a manner to be presently described.

As previously pointed out, the gear segment 85 and the cross shaft 86 to which said segment is fixed are rotated counterclockwise, as viewed in the drawings, during the first half of the cycle and are rotated clockwise during the second half cycle. Referring now to Fig. 3, it will be seen that a gear segment 192 is fixed to the end of the cross shaft 86 opposite the gear segment 85. The teeth of the gear segment 192 mesh with the teeth of a pinion 193. The pinion 193 is rotatable upon a stud 194, and its teeth mesh with the teeth of a rack bar 195 similar to the rack bar 82. As shown and described in Patent No. 2,168,538, issued August 8, 1939, to H. L. Pitman, the rack bar 195 is operatively connected to the hereinbefore mentioned link 163 in order to drive one end of the general operator bar 30. Since the details of such connection form no part of the present invention, the connection has not been shown in the present drawings. However, the gear segment 192 does perform a vital function in carrying out the object of the present invention, as will presently be understood.

Referring now to Figs. 1, 3 and 10-15, it will be observed that the member 170, in addition to the arms 169 and 174, is provided with a third arm 196. The arm 196 is provided with a pin 197 extending through an elongated slot 198 in a member 199. The pin 197 is provided with a square head 200. A relatively light spring 201 extends between a pin 202 on the member 199 and a pin 203 on the arm 196 of member 170 and serves to urge the member 199 toward the right. The left-hand end of the elongated slot 198 abutting the pin 197 on arm 196 normally holds the member 199 in the position shown in Fig. 10. A stationary pin 204, which extends through a slot 205 in the member 170, limits the clockwise rotation of said member by its spring 173.

The right-hand end of member 199 is guided between the stationary plate 171 and a guide member 206 secured to the inner portion of plate 171 and is provided with three steps 207, 208 and 209 separated by shoulders 210 and 211. The step 208 normally rests upon a square stud 212.

The left-hand end of member 199 rests upon a pin 213 fixed to the end of an arm 214 of a bail 215. The bail 215 is pivotally mounted upon a stub shaft 216 carried by the framework, and a second arm 217 of the bail 215 has attached thereto by means of a bolt 218 a member 219. A member 220, having an elongated slot 221 therethrough for sliding upon the bolt 218, is mounted between the member 219 and the arm 217. The arrangement is such that the bolt 218 may slide within the slot 221 of the member 220, but the member 219 is constrained to move with said bolt. A stationary pin 222 fitted within a slot 223 provided in the member 220 serves to guide the lower end of said member. A pin 224 fixed in the member 220 fits into a slot 225 in the member 219 and serves to guide the lower end of the member 219. A spring 226 extends between a tab on the member 219 and a tab on the member 220. A foot 227 on the member 220 rests upon a pin 228 provided on one end of a crank arm 229 the other end of which is fixed to a cross shaft 230.

The cross shaft 230 has fixed thereto a crank 231 for each of the cam followers 54, and the cranks 231 rest upon pins 232 provided on each of the followers 54. Thus, if the cross shaft 230 is rocked, the cranks 231 will be effective to move the followers 54 downward against the action of their respective springs 61 to thereby position the follower heads 60 within the lower set of cam slots 53. However, the cam follower heads 59 and 60 are only simultaneously aligned with their respective cam slots 52 and 53 when the state-control slide is in its normal or retracted position. As will later more fully appear, the cross shaft 230 is rocked only by the end of member 199 pressing down upon the pin 213, and if the cross shaft cannot turn because the cam slots 52 and 53 are not aligned, the pin 213 will move downward and tension the spring 226 without causing a downward movement of member 220 and hence without rocking the cross shaft 230.

Referring particularly to Figs. 10–14, the sequence of events taking place during the blank cycle instituted by the Reverse Computing key 165 will now be explained.

As the member 170 rocks counterclockwise, the pin 197 on the lower end of the arm 196 moves to the right a distance sufficient to allow a latch member 233, which is pivotally mounted at 234 to the aforementioned stationary plate 171, to be snapped down by a spring 235 so that a shoulder 236 on said latch member lies behind the square head 200 of the pin 197, as shown in Fig. 13, to prevent the spring 173 from returning the member 170 to the Fig. 10 position. During the rocking of member 170, the spring 201, extending between the arm 196 of the member 170 and the pin 202 on the member 199, is tensioned and serves to move the member 199 toward the right until the end of said member abuts the teeth of the gear segment 192, as shown in Fig. 11.

The gear segment 192 begins its counterclockwise rotation which, as previously pointed out, takes place during the first half of the cycle, a very short time after the end of member 199 contacts the teeth of said gear segment. A slight amount of movement of the gear segment 192 allows the end of member 199 to be moved farther toward the right by the now tensioned spring 201 until the shoulder 210 contacts the side of the square stud 212. At this time, the step 209 at the end of member 199 will have moved past the teeth of the gear segment 192, as shown in Fig. 12, and will be in a position to be struck by said gear segment during the second half cycle.

During the second half of the cycle, as the gear segment 192 nears the end of its clockwise movement, it strikes against the step 209 and thereby raises the right-hand end of member 199 to lift the shoulder 210 from the side of the square stud 212. The spring 201 thereupon moves the member 199 still farther to the right until the shoulder 211 contacts the teeth of the gear segment 192. The step 207 at that time rests upon the stud 212, as shown in Fig. 14.

As the right-hand end of member 199 is raised, as aforesaid, said member will rock about the pin 197 on arm 196 with the result that the left-hand end of said member will move downward. Since, as previously explained, the left-hand end of member 199 rests upon the pin 213 carried by the arm 214 of bail 215, downward movement of the left-hand end of said member will cause the bail 215 to rock clockwise about the stub shaft 216, and the bail arm 217, due to its above-described connection with the member 219, will move the member 219 downward.

At about the same time that the step 209 on the end of the member 199 is struck by the gear segment 192 to lower the left hand end of said member as aforesaid, the bar 154 picks up the pins 162 of the state-control slides 45 and returns said slides momentarily to their home positions. While the state-control slides are in their home positions, the member 220, spring-connected to the member 219, is moved downward to rock the cross shaft 230 and thereby position the follower heads 60 within the lower cam slots 53. As soon as the cycle is completed, the state-control slide restorer bar 154 is returned to the position shown in Figs. 1 and 3, as previously explained, and the carriage-selected "add" latches 47 or "subtract" latches 130 still being raised, the state-control slides will return to whatever forward positions they had assumed before the blank cycle began. Now, however, the cam followers 54 are controlled by the cam slots 53 rather than by the normal cam slots 52, and, therefore, if a bail 67 has previously been moved to the right to determine addition, it will now be moved to the left to determine subtraction. This will be particularly apparent from an inspection of Fig. 5 where it may be seen that when the state-control slide is halfway forward, the follower 54 will be moved to the right if its head 59 is positioned within the upper cam slot 52 whereas said follower will be moved to the left if its head 60 is positioned within the lower cam slot 53.

Having now conditioned the totalizers for performing a function other than that selected by the carriage, the operator will proceed with the typing and indexing of a number, and as the last digit of the number is typed and indexed, a cycle will be automatically instituted by the carriage, as previously explained. During the carriage-instituted cycle, the gear segment 192 will, of course, again be rotated first counterclockwise and then clockwise. As the gear segment 192 moves counterclockwise enough to clear the shoulder 211 of member 199, the spring 201 will move said member still farther to the right to position the step 208 in the path of return movement of said gear segment. The extent of rightward movement of the member 199 is limited by the pin 197, which, as may be seen in Fig. 15, is contacted by the left-hand end of slot 196. During the return or clockwise movement of the gear segment 192, said segment will contact the step 208 and rock the member 199 an additional amount about the pin 197. This additional downward movement of the left-hand end of member 199 will also result in bringing a pin 237, carried by said member, into contact with a tail portion 238 of the latch member 233 to thereby rock said latch member in a counterclockwise direction and lift its shoulders 236 from behind the square stud 200. The spring 173 is thereupon effective to restore the members 170 and 199 to the normal position shown in Fig. 10. The springs 61 attached to the cam followers 54 will replace the followers in the upper cam slots 52 and will also, by rocking the cross shaft 230, restore the member 220 and the bail 215 to their normal positions. Since, as previously pointed out, the carriage has escaped to a position wherein the dogs of the column unit 19 are no longer effective to depress the cam plates 109 or 132, the various "add" and "subtract" latches 47 and 130 will be restored and the state-control slides will be held in their retracted positions, having been returned during the cycle as above explained. The operator is then ready to tabulate to the next computing column wherein a column unit 19 will again select certain totalizers for operation in accordance with the prearranged schedule.

In order that it may be readily apparent from an inspection of the work sheet which items have been entered positively and which ones have been entered negatively, it is desirable that a "minus" sign or other negative-quantity indicating symbol be automatically printed after-adjacent all negative entries. The present invention contemplates an actuating means for the "minus" sign which will be effective when an item is entered subtractively, regardless of whether the subtractive state is automatically selected by a column unit or whether such state is arrived at by carriage selection of addition followed by a manual operation of the Reverse Computing key, as above explained.

In order not to increase the number of keys on the keyboard, the usual "hyphen" may conveniently be employed as a "minus" sign. Referring to Fig. 1, the "hyphen" or "minus" key is designated at 239. Said key is carried by a key stem 240 which is pivotally mounted at one end upon a support 241, and the key stem is resiliently supported in the Fig. 1 position by a compression spring 242. A pendant 243 is pivotally carried by the key stem 240 and is urged in a counterclockwise direction by a spring 244 extending between one arm of said pendant and a pin on the key stem.

A lever 245 is pivotally mounted intermediate its length upon the support 241 and at its upper end is connected by a link 246 to one arm of a type bar 247 the head of which, of course, carries the "minus" sign. At its lower end, the lever 245 is pivotally connected at 248 to a draw link 249 one end of which carries the usual snatch pawl 250 for cooperating with the usual fluted shaft 251. The right-hand end of draw link 249 rests upon a support 252 and is guided by a comb 253. The draw link is urged in a leftward direction, as viewed in Fig. 1, by a spring 254.

When the key 239 is depressed, the lower end of pendant 243 presses down on the left-hand end of the draw link 249 causing said link to rock about the pivot point 248 until the snatch pawl 250 engages the fluted shaft, whereupon said draw link will be pulled to the right, as viewed in Fig. 1, until a sloping end 255 of said draw link strikes the usual knock-off screw 256. During rightward movement of the draw link 249, the type bar 247 will be actuated to cause the "minus" sign carried thereby to print upon the record sheet carried by the platen 14, as is well known. After the sloping end 255 of the draw link strikes the knock-off screw 256, the spring 254 will be effective to return the parts to the Fig. 1 position. The pendant 243 serves to prevent repeated operation of the type action should the key 239 be held down, as is well known in the art.

When the "minus" sign is to be automatically operated, the right-hand end of the draw link 249 is raised by a pressure from underneath, as will presently fully appear, to move the snatch pawl 250 into engagement with the fluted shaft. For lifting the end of draw link 249, a tab 257 has been provided. The tab 257 is generally L-shaped and is provided with a pair of ears 258 by means of which said tab is pivotally mounted upon a pin 259 carried by an arm 260. A weight 261 is provided upon one arm of the tab and tends to cause said tab to rotate in a clockwise direction about the pin 259. The arm 260 is loosely mounted upon a cross shaft 262 and is provided with a tail portion 263 normally resting upon a bail 264 to hold said arm in the position shown in Figs. 1 and 4. It is to be noted that in the normal position, the upper end of the more or less upright arm of the tab 257 lies above and in front of a flat portion 265 of the draw link 249 and that a portion of the support 252 is cut away at 266 beneath the flat portion.

The bail 264 is loosely mounted upon the hereinbefore referred to cross shaft 152 and is pivotally connected at 267 to one end of a link 268 the other end of which link is pivotally connected at 269 to one end of a long lever 270. The lever 270 is pivotally mounted upon the framework at 271 and is urged in a clockwise direction by a spring 272. It is this clockwise movement of the lever 270 that holds the bail 264 in its normal position.

The front end of lever 270 is provided with a foot 273 which abuts one arm of a bell crank 274, as may best be seen in Figs. 3 and 7. The bell crank 274 is pivotally mounted by means of a screw 275 upon a stationary plate 276 and one arm of said bell crank is provided with a pin 277 for cooperating with a foot 278 carried by a member 279. The member 279 is swingably carried by a plurality of levers 280. There is one lever 280 for each totalizer and each of the levers is pivotally mounted upon the stationary plate 276 by means of a screw 281. Each lever 280 is provided with a tail 282 for cooperating with one of the arms 67' of the slidable bails 67. Thus when any one or more of the bails 67 moves to the left, which, it will be remembered, is the subtraction-determining position, the member 279 will be moved to the right, as viewed in Fig. 7. Rightward movement of the member 279 will cause the bell crank 274 to be rocked, and said bell crank will in turn cause the long lever 270 to be rocked counterclockwise about its pivot 271. When the lever 270 is rocked counterclockwise, the bail 264 will be lowered from the position shown in Figs. 1 and 4 to the position shown in Fig. 17, as will readily be understood. As the bail 264 is lowered, the arm 260 drops by gravity until the lower end of its tail portion 263 comes to rest upon a tab 283 riveted, or otherwise secured, to a blade 284.

The blade 284 is raised slightly during each cycle of the general operator, as will later be explained. With the various parts in the positions shown in Fig. 17, raising of the blade 284 will cause the upper end of the tab 257 to rise but will have no effect upon the draw link 249. Before the draw link 249 can be affected by the tab 257, it is necessary for said tab to be rotated to the position shown in Fig. 18, wherein the upper end of the tab lies within the cut-away part 266 of the support 252 and beneath the flat portion 265 of the draw link.

As may best be seen in Fig. 4, a foot 285 provided upon the end of an arm 286 of a lever 287 normally lies beneath one arm of the tab 257 and prevents said tab from being rotated by its weight 261. The lever 287 is loosely mounted upon the cross shaft 262 and is provided with a second arm 288 having an elongated slot 289 therethrough. A pin 290 provided upon one end of a link 291 extends through the slot 289 to normally prevent the lever 287 from rotating, and thereby holds the tab 257 in the position shown in Fig. 17.

The lever 287 is allowed to rotate from the Fig. 17 to the Fig. 18 position only when the carriage is in one predetermined letter-space position in each computing column, as will now be explained. One end of the link 291 is pivotally connected at 292 to one end of a curved arm 293 the opposite end of which is secured to a cross shaft 294. The cross shaft 294 is urged in a counterclockwise direction, as viewed in the drawings, by a spring 295 to normally position the pin 290 on the end of link 291 in the left-hand end of the slot 289 to hold the arm 287 in the position shown in Figs. 4 and 17, as will readily be understood.

Referring to Fig. 1, an arm 296 is also fixed to the cross shaft 294 and one end of said arm pivotally supports a push rod 297. An intermediate plate 298 rests upon the top of push rod 297 and in turn supports a control plate 299. As may best be seen in Fig. 6, the control plate 299 is not like the cam plates 109 and 132, in that instead of being provided with rather long cam surfaces like the cam plates, said control plate is provided with a tooth 300 for cooperating with a column unit dog 301. The column unit dog 301 and the control plate tooth 300 are so constructed and arranged that said control plate is depressed at only one letter-space position of the column unit, and the particular letter-space position herein employed is that space immediately following the lowest order of the number which has been printed. The dog 301 comes to rest on the tooth 300 immediately after the dog 72 has passed over the lever 73 to institute a machine cycle. The shaft 294 and the dog 301 correspond to the shaft 158 and dog 145 respectively of the copending application Serial No. 45,372, filed August 20, 1948, by H. L. Pitman.

Thus it will be apparent that when the control plate 299 is depressed by the column unit dog 301, the cross shaft 294 will be rocked in a clockwise direction and will thereby draw the link 291 toward the rear of the machine to position the pin 290 in the right-hand end of the slot 289 and allow the lever 287 to move from the position shown in Fig. 17 to the position shown in Fig. 18.

With the lever 287 in the Fig. 18 position, weight 261 rocks the tab 257 in a clockwise direction to position its upper end in the cut-away portion of the support 252 and directly beneath the flat portion 265 of the draw link. With the parts in their Fig. 18 position, raising of the blade 284 will be effective to raise the end of draw link 249 to engage the snatch pawl 250 with the fluted shaft.

Thus it is apparent that before the "minus" sign may be automatically printed, two conditions must be met; namely, a totalizer must be conditioned for performing subtraction, and the carriage must be in a predetermined letter-space position.

The hereinbefore mentioned cross shaft 262 corresponds to cross shaft 216 of application Serial No. 2,654, filed January 16, 1948, by H. L. Pitman, and, as explained in said application, is rocked clockwise during automatic total-taking operations. It is desirable that the "minus" sign be not printed after a total because during total-taking operations the totalizer always is in a subtractive state in order that it will be cleared during the cycling operation, as will readily be understood. Therefore, an arm 302, shown in Figs. 1 and 4, is secured to the cross shaft 262. The arm 302 is provided with a foot 303 which underlies the arm 286 of lever 287. Thus when a total is taken and the shaft 262 is rocked in a clockwise direction, the foot 303 will prevent the lever 287 from rocking and, consequently, prevent the automatic printing of a "minus" sign even though the other necessary conditions are met.

The hereinbefore mentioned blade 284 is old in machines of the type to which the present invention is particularly applicable. Said blade extends entirely across the machine and lies within notches 304 provided therefor in each of the differential operator bars 27. The blade is provided with a pair of supporting pins 305, only one of which is shown, fitted within elongated slots 306 provided within a portion of the framework 307. The lower edge of the blade 284 is moved toward the rear of the machine at the very beginning of each cycle to insure that the differential operators are all in their home positions before starting to run an amount into the totalizers. This function of the blade 284 does not affect the present invention, but a more detailed explanation thereof may be had, if desired, from an inspection of Patent No. 2,118,860, issued May 31, 1938, to H. L. Pitman.

Referring now to Figs. 4, 16 and 19, it will be seen that the blade 284 is provided with a downwardly extending tab 308. A two-armed lever 309 is pivotally mounted at 310 upon the machine framework, and one of its arms is provided with a pin 311 for cooperating with the tab 308. A member 312 is pivotally mounted upon the framework at 313. The member 312 has three arms one of which carries a roller 314 which normally lies within a notch 315 provided in the rack bar 82. Another arm of the member 312 carries a pin 316 against which rests a cam surface 317 provided on one arm of the lever 309. A spring 318, extending between the framework and one arm of the member 312, normally holds said member in the position shown in Fig. 16.

As a cycle begins, the back of the notch 315 cams the roller 314 upward to rock the member 312 in a clockwise direction. As the member 312 moves in its clockwise direction, the pin 316 carried by one arm thereof works against the cam surface 317 to thereby cause the member 309 to rock in a counterclockwise direction. As the member 309 rocks in a counterclockwise direction, the pin 311 moves the lower edge of the blade 284 toward the rear.

At about the time that the blade 284 becomes substantially upright, the general operator bar 30 begins to move forward. Said general operator bar has attached thereto, by means of screws 319 or otherwise, a member 320 having a cam surface 321 on the forward end thereof. As the general operator bar moves forward, the cam surface 321 of the member 320 serves to raise the blade 284 from the position shown in Fig. 19 to the position shown in Fig. 20. As the blade 284 rises, it will, of course, lift the tail portion 263 of the arm 260 and thereby lift the tab 257 which will in turn raise the right-hand end of the draw link 249 to a position wherein the snatch pawl 250 contacts the fluted shaft 251 to cause an automatic printing of the "minus" sign, as aforesaid.

Having now described one specific embodiment of my invention, I claim:

1. In a computing machine having a traveling carriage and adapted for computing in several different columns on a work sheet, a plurality of totalizers each of which comprises a plurality of axially aligned wheels, a set of indexable differential actuators for each totalizer, a set of idler gears in mesh with each set of actuators, a cycling mechanism, a state-control means associated with each totalizer for determining an additive or a subtractive operation thereof, a plurality of control devices associated with said state-control means, means carried by the traveling carriage for operating said control devices whereby one or more of the totalizers may be selected for operation in each work sheet column, means associated with said cycling mechanism for moving the wheels of the selected totalizers into direct engagement with their differential actuators for "addition" or into engagement with the idler gears for "subtraction" in accordance with the determination of the various state-control means, manually selectable means for causing the state-control means for all selected totalizers to determine the opposite operation from that selected by the carriage, said manually selectable means being common to all totalizers, and means operable when the totalizers are selected for "subtraction" to automatically print a negative-quantity indicating symbol during a computing cycle of the cycling mechanism.

2. In a computing machine having a letter-spaceable carriage, a totalizer, a group of indexable differential actuators for said totalizer, a group of idler gears in mesh with said differential actuators, a state-control slide normally retracted but releasable by the carriage for movement to different forward positions, a pair of cam slots in the forward end of said state-control slide, a follower positionable in one or the other of said cam slots and operatively connected to a rockable bail member, said parts being so constructed and arranged that when said state-control slide is in one of its forward positions and the follower is in one of the cam slots, the bail member will be moved to an "addition" determining position and when said state-control slide is in the same forward position but the follower is in the other cam slot, said bail member will be moved to a "subtraction" determining position, a cycling general operator for running indexed amounts into said totalizer, means interconnecting said general operator and said bail member whereby said bail member will be rocked during a cycle of the general operator, a plurality of devices operable by said bail member whereby when said bail member is in an "addition" determining position, the totalizer will be rocked into direct engagement with the differential actuators during a cycle of the general operator and when the bail member is in a "subtraction" determining position, the totalizer will be rocked into engagement with the idler gears during a cycle of the general operator.

3. In a computing machine having a traveling carriage, a totalizer, indexable differential actuators for said totalizer and a cycling general operator for running indexed amounts into said totalizer, state control means selectively operable by the carriage for conditioning the totalizer for receiving amounts additively or subtractively during a cycle of the general operator, manually selectable means for instituting a blank cycle of the general operator and means operated by said general operator during the blank cycle to condition the state control means for determining a subtractive operation during the next cycle of the general operator if said state control means has been carriage selected for addition or to condition the state control means for determining an additive operation if said state control means has been carriage selected for subtraction.

4. In a credit balance computing machine wherein amounts are printed seriatim, a traveling carriage, a cycling general operator, a normally inactive totalizer comprising a plurality of axially aligned wheels, a group of indexable differential actuator racks for running amounts into the wheels of said totalizer, a group of idler gears in mesh with said racks, a rock shaft, a bail member keyed to said rock shaft and movable to different lateral positions thereupon, means to rock said rock shaft and bail member during the early part of a cycle of the general operator, devices associated with said totalizer and said bail member whereby when said bail member is in one lateral position on said rock shaft, rocking of said shaft will cause the totalizer to be moved into direct engagement with the differential actuator racks for "addition" and when said bail member is in another lateral position, rocking of said shaft will cause the totalizer to be moved into engagement with the idler gears for "subtraction," means controlled by the traveling carriage to move said bail member to either an "addition" or a "subtraction" determining position in accordance with a preselected schedule manually controlled means for instituting a blank cycle of the general operator, and means operated by said general operator during said blank cycle to change the position of said bail member so that even though "addition" may be selected by the carriage, the bail member will be moved to a "subtraction" determining position and vice versa.

5. In a credit balance computing machine wherein amounts are printed seriatim, a traveling carriage, a normally inactive totalizer comprising a plurality of axially aligned wheels, a cycling general operator, a group of indexable differential operator racks for running amounts into the wheels of said totalizer, a group of idler gears in mesh with said racks, a rock shaft, a bail member keyed to said rock shaft and movable to different lateral positions thereupon, means to rock said rock shaft and bail member during the early part of a cycle of the general operator, devices associated with said totalizer and said bail member whereby when said bail member is in one lateral position on said rock shaft, rocking of said shaft will cause the totalizer to be moved into direct engagement with the differential operator racks for "addiiton" and when said bail member is in another lateral position, rocking of said shaft will cause the totalizer to be moved into engagement with the idler gears for "subtraction," means operable by the traveling carriage to move said bail member to either an "addition" or a "subtraction" determining position in accordance with a preselected schedule, manually controlled means to reverse the position of said bail member so that even though "addition" may be selected by the carriage, the bail member will be moved to a "subtraction" determining position and vice versa, minus sign printing mechanism, means operable by the movement of said bail member to a "subtraction" determining position to condition said printing mechanism for actuation, and means operable by said general operator during a cycle thereof to actuate said minus sign printing mechanism.

6. In a computing machine having a traveling carriage and adapted for computing in several different columns on a work sheet, a plurality of totalizers each of which comprises a plurality of axially aligned wheels, a set of indexable differential actuators for each totalizer, a set of idler gears in mesh with each set of actuators, a cycling mechanism, a state-control means associated with each totalizer for determining an additive or a subtractive operation thereof, a plurality of control devices associated with said state-control means, means carried by the traveling carriage for operating said control device whereby one or more of the totalizers may be selected for operation in each work sheet column, means associated with said cycling mechanism for moving the wheels of the selected totalizers into direct engagement with their differential actuators for "addition" or into engagement with the idler gears for "subtraction" in accordance with the determination of the various state-control means, a manipulative member, power means made effective by said manipulative member and means operated by said power means for causing the state-control means of all selected totalizers to determine the opposite operation from that selected by the carriage.

ARTHUR H. SHARPE.

References Cited in the file of this patent

UNITED STATES PATENTS

| Number | Name | Date |
|---|---|---|
| 1,359,231 | Corell | Nov. 16, 1920 |
| 1,583,290 | Hart | May 4, 1926 |
| 1,648,667 | Wahl | Nov. 8, 1927 |
| 1,905,305 | Resch | Apr. 25, 1933 |
| 2,089,770 | Suter et al. | Aug. 10, 1937 |
| 2,091,717 | Pitman | Aug. 31, 1937 |
| 2,263,479 | Williams | Nov. 18, 1941 |
| 2,372,681 | Pitman | Apr. 3, 1945 |